United States Patent
Bickford et al.

[11] Patent Number: 6,141,021
[45] Date of Patent: Oct. 31, 2000

[54] METHOD AND APPARATUS FOR ELIMINATING CONTENTION ON AN ACCELERATED GRAPHICS PORT

[75] Inventors: Brad Bickford; Joseph Bursey, both of Hillsboro; Hermann Gartler, Portland, all of Oreg.

[73] Assignee: Intel Corporation, Santa Clara, Calif.

[21] Appl. No.: 08/989,755

[22] Filed: Dec. 12, 1997

[51] Int. Cl.[7] ................................. G06F 13/14
[52] U.S. Cl. .................. 345/503; 345/520; 710/129; 710/126
[58] Field of Search ................... 345/501, 503, 345/505, 519–521, 526, 506; 395/280, 282, 306, 311, 312, 856, 858; 710/100, 102, 126, 129, 130, 131, 132, 10, 28, 37, 51, 104

[56] References Cited

U.S. PATENT DOCUMENTS

| | | | |
|---|---|---|---|
| 5,237,690 | 8/1993 | Bealkowski et al. | 212/203 |
| 5,321,806 | 6/1994 | Meinerth et al. | 345/522 |
| 5,574,948 | 11/1996 | Lin et al. | 710/10 |
| 5,592,678 | 1/1997 | Cook et al. | 709/301 |
| 5,623,628 | 4/1997 | Brayton et al. | 711/141 |
| 5,630,174 | 5/1997 | Stone, III et al. | 345/520 |
| 5,680,625 | 10/1997 | Sekine et al. | 710/7 |
| 5,768,612 | 6/1998 | Nelson | 710/129 |
| 5,799,204 | 8/1998 | Pesto, Jr. | 710/10 |
| 5,857,083 | 1/1999 | Venkat | 395/309 |
| 5,884,102 | 3/1999 | England et al. | 710/62 |
| 5,889,970 | 3/1999 | Horan et al. | 710/126 |
| 5,892,964 | 4/1999 | Horan et al. | 712/33 |
| 5,911,051 | 6/1999 | Carson et al. | 710/107 |
| 5,914,727 | 6/1999 | Horan et al. | 345/503 |
| 5,915,265 | 6/1999 | Corcker et al. | 711/170 |
| 5,937,173 | 8/1999 | Olarig et al. | 710/126 |

Primary Examiner—Ulka J. Chauhan
Attorney, Agent, or Firm—Blakely, Sokoloff, Taylor & Zafman LLP

[57] ABSTRACT

A device and method to eliminate contention for an accelerated graphics port (AGP). A video system includes an accelerated graphics port, a first location adapted to receive and couple an AGP controller to the accelerated graphics port, a second location adapted to receive and couple an AGP graphics accelerator chip to the accelerated graphics port, and at least one connector coupled to the accelerated graphics port that is adapted to receive an AGP graphics accelerator add-in card. Further, a device is coupled to the accelerated graphics port that selectively disables an AGP graphics accelerator chip coupled to the second location or an AGP graphics accelerator add-in card coupled to the connector.

28 Claims, 3 Drawing Sheets

METHOD AND APPARATUS FOR ELIMINATING CONTENTION ON AN ACCELERATED GRAPHICS PORT

BACKGROUND OF THE INVENTION

1. Field of the Invention

The invention relates to accelerated graphics port (AGP) devices, and more specifically, to a method and apparatus for eliminating bus contention on an AGP device.

2. Description of Related Art

The rapid growth in popularity of graphical computer operating systems, such as Microsoft Windows, has resulted in a tremendous increase in the amount of information that must be moved between a computer's processor, memory, video and hard disks. Information is transmitted between various computer system components over a bus. A bus is like a highway on which data travel within a computer. A bus normally has access points, or places into which a device can tap to become attached to the bus, and devices on the bus can send to, and receive information from, other devices. Further, computer systems typically have multiple buses. For example, the processor bus is used to transfer information between the CPU, or processor, and system memory, and an I/O bus is used for communication among devices such as video cards, disk storage devices, networks, mice, modems, etc., and the CPU and memory. The industry standard architecture (ISA) bus was commonly used as the I/O bus in early personal computer (PC) systems.

The transformation of the software world from text to graphics also resulted in much larger programs and more storage requirements. A complete screen of monochrome text is just 2,000 bytes of information. A standard 256-color Windows screen requires over 300,000 bytes, an increase of about 15,000%. From an I/O bus standpoint, much more I/O bandwidth is needed to handle the additional data going to and from the video card and the increasingly larger and faster hard disks. Further, CPU performance continues to increase in a similar manner, additionally increasing the demands for transmitting information over the bus.

The ISA bus, still running at the same speed and bus width that it did on the IBM AT, was finally and totally overcome by these increasing demands and became a major bottleneck to improving system performance. Increasing the speed of the processor accomplished little if it was always waiting for the slow I/O bus to transmit data. Thus, a faster bus that would augment the ISA bus and be used especially for high-bandwidth devices such as video cards was developed. This new bus was put on (or near) the much faster processor bus, to let it run at or near the external speed of the processor, and to allow data to flow between these devices and the processor without having to go through the much slower ISA bus. By placing these devices "local" to the processor, the local bus. was born.

The first local bus to gain popularity was the Video Electronics Standards Association (VESA) local bus. The VESA local bus was developed primarily to improve video performance in PCs. The VESA bus is a 32-bit bus, which is in a way a direct extension of the processor bus with which it was implemented. The VESA bus has largely been replaced by the peripheral component interconnect (PCI) bus. The PCI bus is described in detail in the *PCI Local Bus Specification*, revision 2.1, available from the PCI Special Interest Group, Hillsboro, Oregon. The PCI Local Bus Specification is incorporated by reference herein in its entirety.

The PCI bus can transfer information in a burst mode, wherein after an initial address is provided, multiple sets of data can be transmitted sequentially. On a bus such as the PCI bus, a great deal of information flows through the bus every second. Normally, the processor is required to control the transfer of this information. To improve performance, some devices on the bus have the ability to take control of the bus and do the work themselves. Devices that can do this are called bus masters.

FIG. 1 illustrates a prior art computer system 10 employing a PCI local bus 12. The system includes a system CPU 14 coupled to a chipset 16. The chipset 16 is coupled to the system memory 18 and the PCI bus 12. A graphics accelerator 20 is coupled to a video memory 22 and the PCI bus 12. The graphics accelerator 20 is coupled to a display device 24. A plurality of I/O devices 25, such as disk storage devices, audio systems, network interfaces, etc., are further coupled to the PCI bus 12.

The graphics accelerator 20 may be installed directly on a motherboard, in which case it is known as an "on board" or "video down" graphics accelerator. Alternatively, the graphics accelerator 20 may be installed as a component on a separate circuit card assembly that is seated in a connector coupled to the PCI bus 12, referred to as an "addin" video card. The video down graphics solution is desirable, since it is typically cheaper than an add-in card. A single chip is involved rather than an entire circuit card assembly. If the user desires to upgrade a video down graphics accelerator to a higher performance graphics accelerator chip, however, an add-in card is required.

As shown in FIG. 1, the video system "shares" the PCI bus with several other I/O devices. Computer video has increased in complexity with developments in areas such as 3D acceleration and full-motion video playback Hence, the amount of information transferred between the graphics accelerator and the system chipset has greatly increased, placing greater demands on the PCI bus. To prevent saturation of the PCI bus with video information, a new information interface was developed known as an accelerated graphics port (AGP). The AGP is based on a set of performance extensions or enhancements to the PCI bus. AGP is discussed further in the *Accelerated Graphics Port Interface Specification*, revision 1.0, dated Jul. 31, 1996, available from Intel Corp., which is hereby incorporated by reference in its entirety.

FIG. 2 illustrates a prior art computer system 11 including an AGP 26. In addition to providing an AGP on the system motherboard, the graphics accelerator 21 must be AGP-compliant, and the chipset 16 must include an AGP controller. The configuration of the computer system 11 is essentially identical to the computer system 10 illustrated in FIG. 1, except the AGP graphics accelerator 21 is not coupled to the PCI bus 12. Rather, the AGP 26 connects the AGP graphics accelerator 21 to the chipset/AGP controller 17.

The AGP 21 provides a dedicated, high-speed data connection directly between the chipset 17 and the graphics accelerator 21, and also frees the video traffic from the constraints of the PCI bus 12.

As discussed above, a video down graphics accelerator is often desirable from a cost standpoint. An onboard PCI graphics accelerator can be upgraded simply by seating a PCI graphics accelerator add-in card in a PCI expansion slot. The PCI bus 12 is designed to provide data transfer among several devices. At boot-up, each device 25 on the PCI bus is configured. Thus, an ID select (IDSEL) is assigned to each device 25 on the PCI bus 12 to identify the target of a configuration transaction. During configuration transactions, each device 25 on the PCI bus 12 samples its IDSEL during each PCI bus transaction to determine whether it is the target of the configuration transaction.

The AGP 26 is patterned after the PCI bus 12. As illustrated in FIG. 2, however, the AGP 26 connects only two devices, rather than providing a transmission path for several devices. Thus, the AGP 26 is referred to as a "port" rather than a "bus," since it provides a "point to point" connection. To this end, the AGP 26 and AGP compliant devices are configured such that only two devices, the AGP graphics accelerator 21 and the system chipset 17, may be coupled to the AGP. The IDSEL is internally connected to a preselected address line, since there is no requirement to identify the target of a configuration transaction. This creates a problem when a computer user desires to upgrade from an onboard, or video down, AGP graphics accelerator 21 to another AGP graphics accelerator. If an additional AGP graphics accelerator is coupled to the AGP 26 (via an add-in card connector), both AGP graphics accelerators will contend for the AGP 26, attempting to simultaneously respond to AGP cycles, locking the AGP 26.

With existing AGP implementations, the only way to upgrade to an improved AGP graphics accelerator is to replace the entire motherboard or attempt to desolder the existing chip from the motherboard and solder in a new chip. Neither solution is practical. This is confirmed by revision 1.0 of the AGP specification (July 1996), which states, "[T]he AGP video solution can be implemented either integrated as video down on the motherboard, or as an AGP expansion slot, but both cannot be supported simultaneously."

Thus, a need exists for a device and method for eliminating contention for an AGP among multiple AGP devices.

SUMMARY OF THE INVENTION

In one aspect of the invention, a video system includes an accelerated graphics port, a first location adapted to receive and couple an AGP controller to the accelerated graphics port, a second location adapted to receive and couple an AGP graphics accelerator chip to the accelerated graphics port, and at least one connector coupled to the accelerated graphics port that is adapted to receive an AGP graphics accelerator add-in card. Further, a device is coupled to the accelerated graphics port for selectively disabling an AGP graphics accelerator chip coupled to the second location or an AGP graphics accelerator add-in card coupled to the connector.

Another aspect of the invention provides a method for eliminating contention between an onboard AGP graphics accelerator chip and an AGP graphics accelerator add-in card coupled to an accelerated graphics port. The method includes selectively routing at least one signal transmitted on the accelerated graphics port to either the onboard AGP graphics accelerator chip or the AGP graphics accelerator add-in card.

BRIEF DESCRIPTION OF THE DRAWINGS

Other objects and advantages of the invention will become apparent upon reading the following detailed description and upon reference to the drawings in which.

Figure 1:
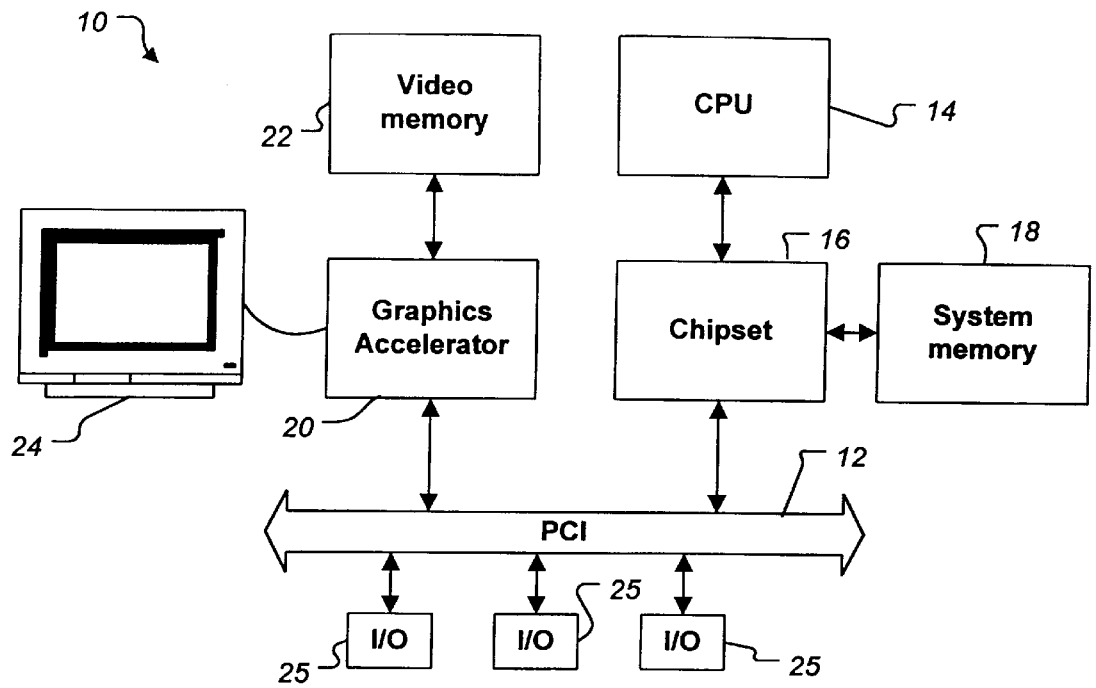
FIG. 1 is a block diagram illustrating a prior art computer system employing a PCI local bus.
Figure 2:
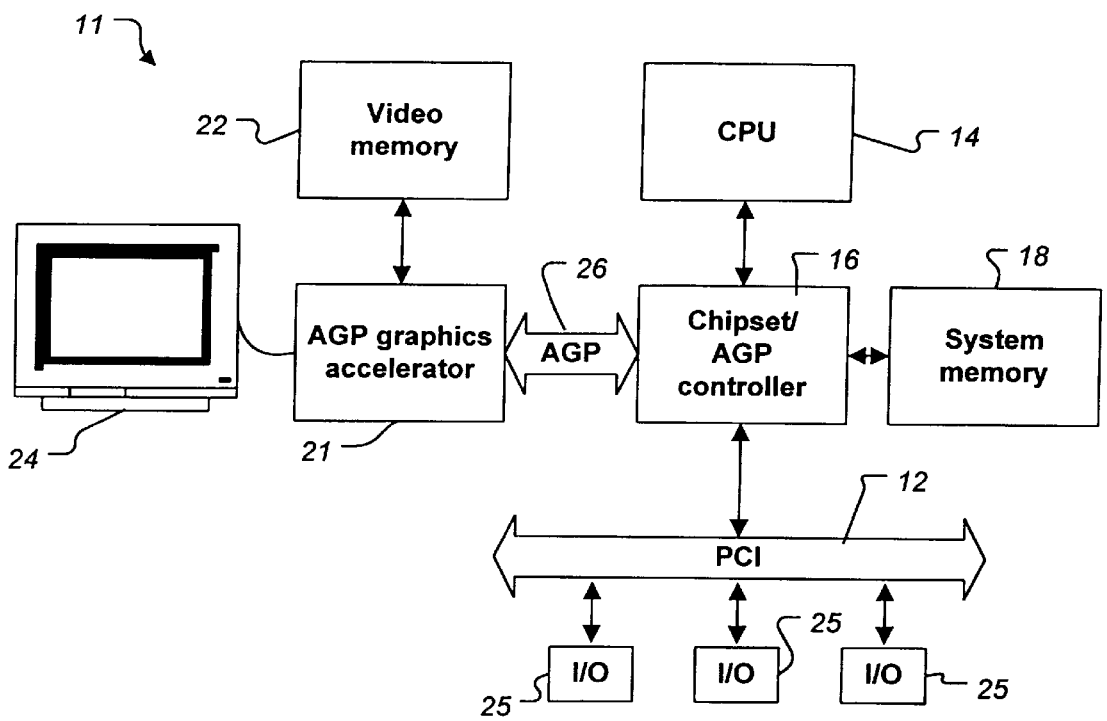
FIG. 2 is a block diagram illustrating a prior art accelerated graphics port system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
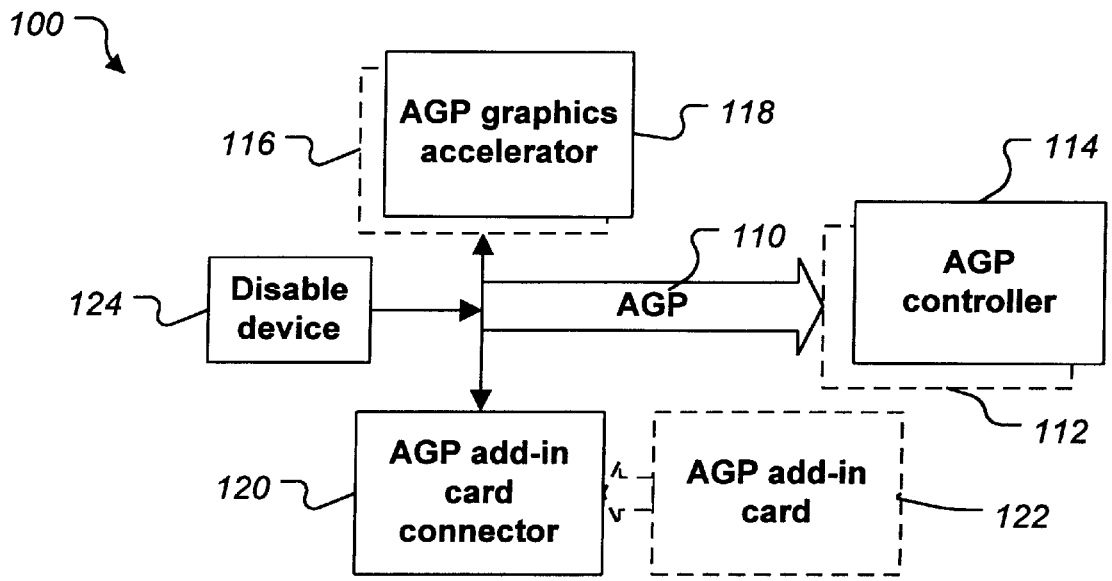
FIG. 3 is a block diagram illustrating an embodiment of an accelerated graphics port system in accordance with the present invention.

FIG. 3 is a block diagram of an accelerated graphics port (AGP) video system 100 in accordance with an embodiment of the present invention. The video system 100, which would typically be implemented on a system motherboard (not shown in FIG. 3), includes an AGP 110. A first location 112 is adapted to receive an AGP-compliant controller 114 and couple the AGP controller 114 to the AGP 110. The AGP controller may be an integral component of a system chipset. A second location 116 is adapted to receive an AGP graphics accelerator chip 118 and couple the graphics accelerator chip 118 to the AGP 110, thus providing an onboard, or video down AGP graphics accelerator.

Further, a connector 120 adapted to receive an AGP graphics accelerator add-in card 122 is coupled to the AGP 110, along with a device 124 for selectively disabling either the video down AGP graphics accelerator 118 or the add-in AGP card seated 122 in the connector 120. Thus, two AGP graphics accelerators 118, 122 may be simultaneously coupled to the AGP 110, since the device 124 disables one of the AGP graphics accelerators 118, 122 and prevents both devices 118, 122 from contending for the AGP 110.

As discussed in the Background of the Invention section, the IDSEL pin is not available to identify which of the graphics accelerators 118, 122 is targeted by an AGP configuration transaction. Thus, in one embodiment in accordance with the present invention, the disable device 124 prevents at least one signal transmitted on the AGP 110 from reaching the AGP graphics accelerator 118, 122 to be disabled. In an exemplary embodiment of the invention, the device 124 disables the video down AGP graphics accelerator 118 when the add-in card 122 is seated in the connector 120 by preventing the video down AGP graphics accelerator 118 from receiving a signal transmitted over the AGP 110.

In the PCI bus protocol, a FRAME# signal is driven by a PCI bus master to indicate the start of a configuration transaction. The AGP controller 114 uses the FRAME# signal in the same way. Thus, in one embodiment of the invention, the disable device 124 prevents the FRAME# signal from reaching the AGP graphics accelerator 118, 122 that is to be disabled. The AGP graphics accelerator 118, 122 to be disabled does not receive the FRAME# signal, so it does not respond to configuration transactions and thus, is never configured. Since it is never configured, the disabled AGP graphics accelerator does not attempt to respond to transactions and interfere with the "active" AGP graphics accelerator 118, 122.

Figure 4:
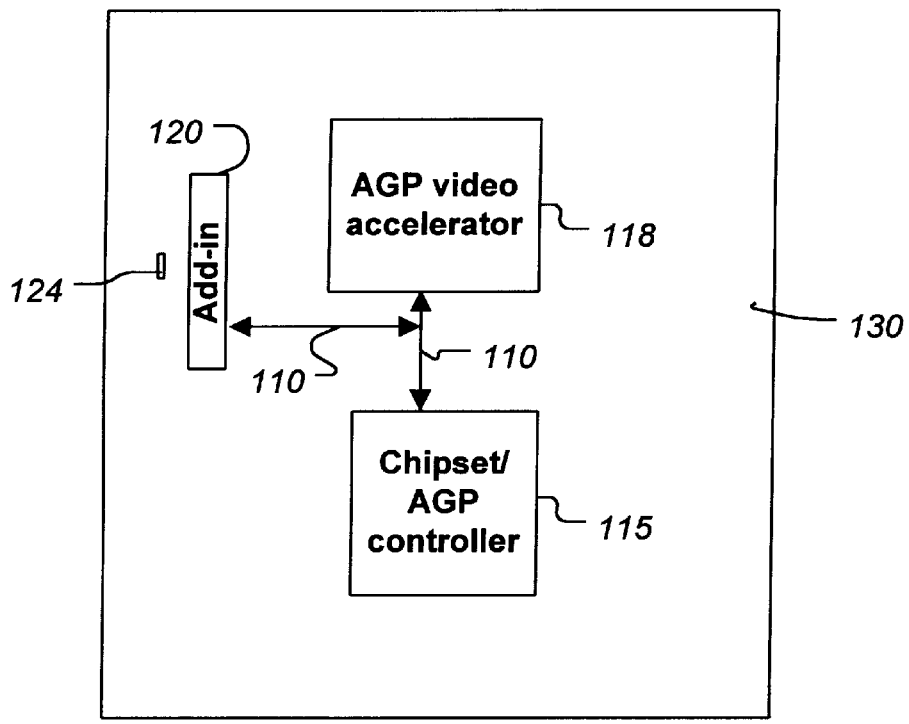
FIG. 4 illustrates an exemplary embodiment of the present invention implemented on a motherboard.

FIG. 4 illustrates an exemplary embodiment of the invention implemented on a motherboard 130 that includes an AGP 110. A system chipset 115 that incorporates an AGP controller is installed on the motherboard 130. The chipset 115 is further coupled to the AGP 110. A video down AGP graphics accelerator chip 118 is coupled to the AGP 110, along with at least one add-in connector 120 that is adapted to receive an AGP graphics accelerator add-in card (not shown in FIG. 4), such that when an add-in card is seated in the connector 120, the add-in AGP graphics accelerator is coupled to the AGP 110. Further, a device 124 is coupled to the motherboard that selectively disables either the video down AGP graphics accelerator chip 118 or an add-in card seated in the connector 120.

Figure 5:
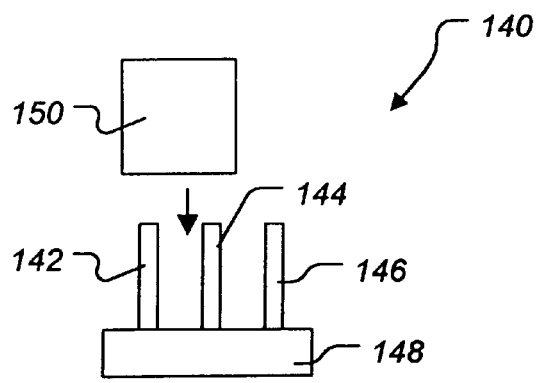
FIG. 5 illustrates a jumper in accordance with an embodiment of the present invention.

In an exemplary embodiment of the invention, the device 124 for disabling the video down AGP graphics accelerator 118 or the add-in card 122 comprises a jumper, through other implementations are possible, such as a selector switch, a pass through switch, etc. A jumper is a metal bridge that closes an electrical circuit. FIG. 5 illustrates an exemplary jumper 140 in accordance with an embodiment of the present invention. The jumper 140 illustrated in FIG. 5 includes first, second and third aligned pins 142, 144, 146 extending from a base 148. The jumper 140 further includes a plug 150 that fits over a pair of the protruding pins 142, 144, 146. For example, the jumper 140 may be configured such that when the plug 150 is placed over the first and second pins 142, 144, as shown in FIG. 5, the onboard, or video down, AGP graphics accelerator chip 118 is enabled and the add-in card connector 120 is disabled. Alternatively, when the plug 150 is placed over the second and third pins 144, 146, the video down AGP graphics accelerator chip 118 is disabled and an AGP graphics accelerator add-in card 122 seated in the connector 120 is enabled.

Other configurations of the jumper 140 are possible and would be a routine undertaking for one skilled in the art having the benefit of this disclosure. For example, a motherboard 130 having multiple AGP graphics accelerator add-in card connectors 120 would require a jumper 140 having additional pins. The jumper 140 would be configured such that the video down AGP graphics accelerator chip 118 is enabled when the plug 150 is placed over one pair of pins, a first add-in connector 120 is enabled when the plug 150 is placed over another pair of pins, a second add-in connector is enabled when the plug 150 is placed over a further pair of pins, etc.

In a particular embodiment, the jumper 140 is arranged such that it selectively enables the desired AGP graphics accelerator 118, 122 by routing at least one signal transmitted on the AGP 110. For example, the jumper 140 may be configured in a manner to route the FRAME# signal only to the desired AGP graphics accelerator 118, 122, thereby enabling the selected device and disabling any other AGP graphics accelerators coupled to the AGP 110.

In an alternate embodiment of the invention, a pass-through switch is used to disable the video down AGP graphics accelerator chip when an add-in card is seated in the connector. The pass-through switch is arranged such that at least one signal is prevented from reaching the video down AGP graphics accelerator chip when it determines that an add-in card is seated in the connector, thereby disabling the video down AGP graphics accelerator chip. When the connector does not have an add-in card seated therein, it allows the signal to "pass-through" to the video down AGP graphics accelerator chip.

Figure 6:
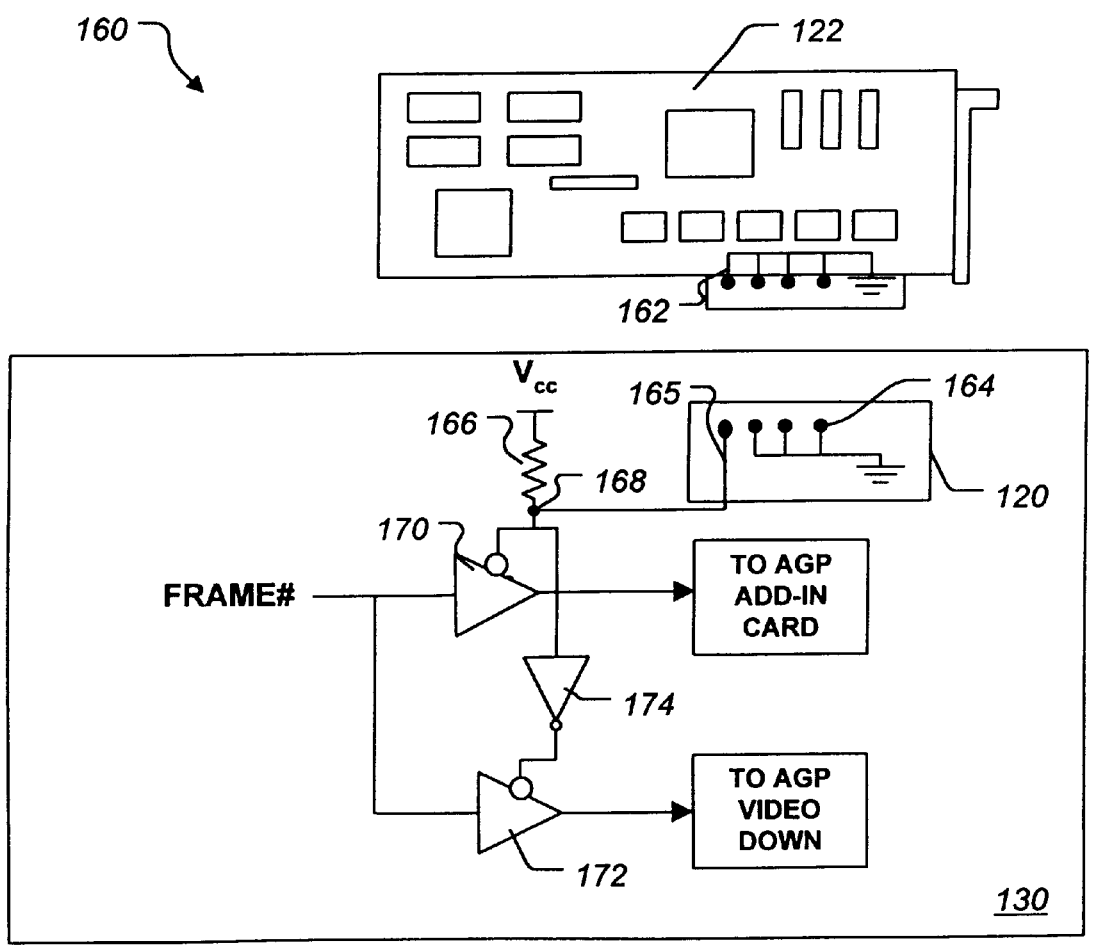
FIG. 6 illustrates an exemplary pass-through switch in accordance with an embodiment of the invention.

An exemplary pass-through switch configuration 160 in accordance with an embodiment of the invention is illustrated in FIG. 6. The AGP graphics accelerator add-in card 122 includes a plurality of connection pins 162 coupled to ground. The motherboard 130 includes a corresponding plurality of pins 164 that would normally also be coupled to ground. One pin 165, however, is connected to a voltage supply $V_{CC}$ through a pull-up resistor 166 rather than ground. If the AGP add-in card 122 is seated in the connector 120, the pin 165 is grounded through the pins 162 on the add-in card 122. Therefore, an add-in detect node 168 is logically low. If there is no add-in card 122 seated in the connector 120, the pull-up resistor 166 pulls the add-in detect node 168 logically high.

At least one of the AGP signals, for example, the AGP FRAME# signal, is coupled to first and second buffers 170, 172. The first buffer 170 routes the FRAME# signal to the AGP add-in card 122, and the second buffer 172 routes the FRAME# signal to the video down AGP graphics accelerator chip 118. The add-in detect node 168 is coupled directly to the first buffer 170 and to the second buffer 172 through an inverter 174. Thus, when the AGP add-in card is seated in the connector 120, the add-in detect node 168 is logically low, causing the first buffer 170 to route the FRAME# signal to the AGP add-in card. Further, the logically low add-in detect node 168 causes the second buffer 172 to block the FRAME# signal from the video down AGP graphics accelerator chip. Since the video down AGP graphics accelerator does not receive the FRAME# signal, it is never configured, effectively disabling it. If the add-in card 122 is not seated in the connector 120, the add-in detect node 168 is logically high, causing the first buffer 170 to route the FRAME# signal to the video down AGP graphics accelerator 118.

As with the embodiment employing the jumper 140, the exemplary pass-through switch 160 may disable the video down AGP graphics accelerator chip 118 when an add-in card 122 is seated in the connector 120 by preventing the FRAME# signal from reaching the video down AGP graphics accelerator chip 118, though other AGP signals may also be used. As discussed above, any AGP graphics accelerators 118, 122 that do not receive the FRAME# signal are not configured; thus, they remain quiescent on the AGP 110. The FRAME# works particularly well in an embodiment employing the pass through switch 160, since the FRAME# signal is a "protocol" signal rather than a "data" signal. During a single AGP transaction, data signals are typically asserted and deasserted on specific clock pulses, presenting difficult timing issues that must be addressed in the pass-through switch 160 design. On the other hand, the FRAME# signal remains asserted throughout a configuration transaction, greatly simplifying any timing issues.

Thus, the present invention provides a method and device for eliminating contention between more than one AGP video accelerator coupled to an AGP, allowing a user to upgrade a video down AGP system. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A video system comprising:
   an accelerated graphics port (AGP);
   a first location adapted to receive and to couple an AGP controller to the AGP;
   a second location adapted to receive and to couple an AGP graphics accelerator chip to the AGP;
   at least one connector coupled to the AGP; the connector adapted to receive an AGP graphics accelerator add-in card; and
   a device coupled to the (accelerated graphics port) AGP to selectively disable at least one of the second location and the connector.

2. The system of claim 1, wherein the device disables an AGP graphics accelerator chip coupled to the second location.

3. The system of claim 1, wherein the device prevents at least one of an AGP graphics accelerator chip coupled to the second location and an AGP graphics accelerator add-in card seated in the connector from receiving at least one signal transmitted on the AGP.

4. The system of claim 3, wherein an AGP controller coupled to the first location drives a FRAME# signal on the AGP, and wherein the at least one signal is the FRAME# signal.

5. The system of claim 3, wherein the device comprises a jumper for selectively routing the at least one signal.

6. The system of claim 5, wherein the jumper includes a first configuration that routes the at least one signal to the connector.

7. The system of claim 5, wherein the jumper comprises:
   first, second and third aligned pins extending from a base; and
   a plug adapted to fit over two of the pins and electrically couple the two pins, such that the jumper routes the at least one signal to the second location when the jumper is seated over the first and second pins, and the jumper routes the at least one signal to the connector when the jumper is seated over the second and third pins.

8. The system of claim 2, wherein the device coupled to the accelerated graphics port comprises a pass-through switch for routing at least one signal transmitted on the AGP to an AGP graphics accelerator chip coupled to the second location when the connector does not have an AGP graphics accelerator add-in card seated therein.

9. The system of claim 1, further comprising an AGP controller coupled to the first location.

10. The system of claim 1, further comprising an AGP graphics accelerator chip coupled to the second location.

11. The system of claim 1, further comprising a motherboard, wherein the AGP, the first and second locations, the connector, and the device are integral with the motherboard.

12. A video system comprising:
   an accelerated graphics port (AGP);
   an AGP controller coupled to the AGP;
   an AGP graphics accelerator coupled to the AGP;
   at least one connector coupled to the AGP, each connector adapted to receive an AGP add-in card; and
   means for disabling the AGP graphics accelerator.

13. An accelerated graphics port (AGP) video system comprising:
   a motherboard;
   an AGP on the motherboard;
   an AGP controller coupled to the AGP;
   an AGP graphics accelerator chip coupled to the AGP;
   at least one connector coupled to the AGP, each connector adapted to receive an AGP graphics accelerator add-in card; and
   a device coupled to the motherboard for selectively disabling at least one of the AGP graphics accelerator chip and an AGP graphics accelerator add-in card seated in the connector.

14. The system of claim 13, wherein the device disables the AGP graphics accelerator chip.

15. The system of claim 14, wherein the device disables the AGP graphics chip when an AGP graphics accelerator add-in card is seated in the connector.

16. The system of claim 13, wherein the device coupled to the motherboard prevents at least one of the AGP graphics accelerator chip and an AGP graphics accelerator add-in card seated in the connector from receiving at least one signal transmitted on the AGP.

17. The system of claim 14, wherein the AGP controller drives a FRAME# signal on the AGP, and wherein the at least one signal is the FRAME# signal.

18. A method for eliminating contention between an onboard accelerated graphics port (AGP) graphics accelerator chip and an AGP graphics accelerator add-in card coupled to an AGP, the method comprising the act of selectively routing at least one signal transmitted on the AGP to one of the onboard AGP graphics accelerator chip and the AGP graphics accelerator add-in card.

19. The method of claim 18, wherein an AGP controller is coupled to the AGP and the AGP controller drives a FRAME# signal on the AGP; wherein the preventing act comprises preventing the onboard AGP graphics accelerator chip from receiving the FRAME# signal.

20. The method of claim 19, further comprising the act of determining whether an AGP graphics accelerator add-in card is coupled to the AGP.

21. A video system comprising:
   an accelerated graphics port (AGP);
   an AGP compatible chipset;
   an AGP graphics accelerator integrated onto a motherboard or with the AGP compatible chipset, and coupled with the AGP compatible chipset by the AGP;
   a connector coupled with the AGP, the connector adapted to receive an AGP graphics accelerator card; and
   a device coupled with the AGP having a first configuration that disables the AGP accelerator chip or chipset and a second configuration that enables the AGP accelerator chip or chipset.

22. The video system of claim 21, wherein the device in the first configuration prevents the AGP accelerator chip or chipset from receiving at least one signal transmitted on the AGP.

23. The system of claim 22, wherein the device in the first configuration enables the transmission of the at least one signal to the connector.

24. The system of claim 22, wherein the at least one signal comprises a FRAME# signal transmitted on the AGP by the AGP compatible chipset.

25. The system of claim 22, wherein the device comprises a jumper that in the first configuration prevents the transmission of the at least one signal to the AGP accelerator chip or chipset and enables transmission of the at least one signal to the connector.

26. The system of claim 25, wherein the jumper comprises:

first, second and third aligned pins extending from a base; and a plug adapted to seat over two of the pins and electrically couple the two pins, the first configuration comprises the plug seated over the first pin and the second pin, and the second configuration comprises the plug seated over the second pin and the third pin, the second configuration enabling the transmission of the at least one signal to the AGP accelerator chip or chipset.

27. The system of claim 22, wherein the device comprises a pass-through switch that has a first position corresponding to the first configuration and a second position corresponding to the second configuration.

28. The system of claim 22, wherein the first configuration comprises an AGP graphics accelerator add-in card seated in the connector.

* * * * *